US011665347B2

(12) United States Patent
Urban et al.

(10) Patent No.: US 11,665,347 B2
(45) Date of Patent: May 30, 2023

(54) METHOD AND APPARATUS FOR SELECTING A CODING MODE USED FOR ENCODING/DECODING A RESIDUAL BLOCK

(71) Applicant: INTERDIGITAL VC HOLDINGS, INC., Wilmington, DE (US)

(72) Inventors: Fabrice Urban, Thorigné-Fouillard (FR); Tangi Poirier, Thorigné-Fouillard (FR); Fabrice Leleannec, Mouazé (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/378,649

(22) Filed: Jul. 16, 2021

(65) Prior Publication Data
US 2021/0400271 A1   Dec. 23, 2021

Related U.S. Application Data

(63) Continuation of application No. 16/477,430, filed as application No. PCT/EP2018/050314 on Jan. 8, 2018, now Pat. No. 11,109,027.

(30) Foreign Application Priority Data

Jan. 11, 2017  (EP) ..................................... 17305029

(51) Int. Cl.
*H04N 11/02*  (2006.01)
*H04N 19/12*  (2014.01)
(Continued)

(52) U.S. Cl.
CPC .......... *H04N 19/12* (2014.11); *H04N 19/105* (2014.11); *H04N 19/176* (2014.11); *H04N 19/60* (2014.11)

(58) Field of Classification Search
CPC ...................................................... H04N 19/12
(Continued)

(56) References Cited

U.S. PATENT DOCUMENTS

| 9,036,712 B1* | 5/2015 | Cote ................... H04N 19/132 |
| | | 375/240.24 |
| 2005/0052294 A1 | 3/2005 | Liang et al. |

(Continued)

FOREIGN PATENT DOCUMENTS

| CN | 101001374 A | 7/2007 |
| CN | 104380734 A | 2/2015 |

OTHER PUBLICATIONS

Anonymous, "Advanced video coding for generic audiovisual services", International Telecommunication Union, ITU-T Telecommunication Standardization Sector of ITU, Series H: Audiovisual and Multimedia Systems, Infrastructure of audiovisual services—Coding of moving video, Recommendation ITU-T H.264, Feb. 2014, pp. 1-790.

(Continued)

*Primary Examiner* — Leron Beck
(74) *Attorney, Agent, or Firm* — Invention Mine LLC

(57) ABSTRACT

The present principles relate to a method and device. A method for encoding a residual block comprises: obtaining (500) a first coding mode relative to a first 2D transform when coding the residual blocks according to a coding mode relative to a first 2D transform is enabled; obtaining (510) a second coding mode relative to a second 2D transform when coding the residual blocks according to a coding mode relative to a second 2D transform is enabled; and encoding (530) the residual block according to either said first coding mode or said second coding mode or both; the method is characterized in that enabling or disabling (520) the coding of the residual block according to said second coding mode depends on said first coding mode. The present principles (Continued)

relate also to a method and device for encoding/decoding a picture.

20 Claims, 6 Drawing Sheets

(51) Int. Cl.
*H04N 19/105* (2014.01)
*H04N 19/176* (2014.01)
*H04N 19/60* (2014.01)

(58) Field of Classification Search
USPC .................................................. 375/240.02
See application file for complete search history.

(56) References Cited

U.S. PATENT DOCUMENTS

| | | | | |
|---|---|---|---|---|
| 2010/0135387 A1* | 6/2010 | Divorra Escoda ... | H04N 19/119 | 375/240.12 |
| 2011/0002388 A1* | 1/2011 | Karczewicz ......... | H04N 19/573 | 375/E7.125 |
| 2011/0261882 A1* | 10/2011 | Zheng .................. | H04N 19/573 | 375/E7.123 |
| 2011/0268183 A1* | 11/2011 | Sole .................... | H04N 19/137 | 375/240.18 |
| 2012/0127003 A1* | 5/2012 | Shibahara ............ | H04N 19/129 | 341/87 |
| 2012/0170649 A1* | 7/2012 | Chen .................... | H04N 19/147 | 375/240.18 |
| 2013/0022110 A1* | 1/2013 | Kumakura ............ | H04N 19/61 | 375/240.03 |
| 2013/0121416 A1* | 5/2013 | He ....................... | H04N 19/567 | 375/240.14 |
| 2013/0243083 A1* | 9/2013 | Sezer ................... | H04N 19/91 | 375/240.18 |
| 2013/0343448 A1* | 12/2013 | He ....................... | H04N 19/122 | 375/240.03 |
| 2014/0049605 A1* | 2/2014 | Chen .................... | H04N 13/10 | 348/43 |
| 2014/0092978 A1* | 4/2014 | Bugdayci .............. | H04N 19/30 | 375/240.16 |
| 2014/0161189 A1* | 6/2014 | Zhang .................. | H04N 19/176 | 375/240.16 |
| 2014/0205020 A1* | 7/2014 | Lou ...................... | H04N 19/40 | 375/240.26 |
| 2014/0376626 A1* | 12/2014 | Lee ...................... | H04N 19/70 | 375/240.12 |
| 2015/0016515 A1 | 1/2015 | Naccari et al. | | |
| 2015/0208086 A1* | 7/2015 | Chen .................... | H04N 19/197 | 375/240.16 |
| 2015/0249833 A1* | 9/2015 | Tourapis .............. | H04N 19/154 | 375/240.03 |
| 2015/0373366 A1* | 12/2015 | He ....................... | H04N 19/70 | 375/240.16 |
| 2016/0100175 A1* | 4/2016 | Laroche ............... | H04N 19/192 | 375/240.18 |
| 2017/0094314 A1* | 3/2017 | Zhao .................... | H04N 19/159 | |

OTHER PUBLICATIONS

Chen, Jianle. et. al., "Algorithm Description of Joint Exploration Test Model 3", Joint Video Exploration Team (JVET) of ITU-T SG 16 WP 3 and ISO/IEC JTC 1/SC 29/WG 11, 3rd Meeting, 2016, pp. 1-37.

Tsukuba, Takeshi, et. al., "EE2.7-related: On secondary transform when primary transform is skipped", Joint Video Exploration Team (JVET) of ITU-T SG 16 WP 3 and ISO/IEC JTC 1/SC 29/WG 11, 3rd Meeting, 2016, pp. 1-6.

Chen, J., et al., "Coding tools investigation for next generation video coding", ITU Telecommunication Standardization Sector Study Period 2013-2016 COM16-C806-E, Jan. 2015, pp. 1-7.

Zhao, X., et al., "Mode-dependent non-separable secondary transform", ITU Telecommunication Standardization Sector Study Period 2013-2016 COM16-C1044-E, Sep. 2015, pp. 1-5.

Zhao, X., et al., "EE2.7: ITU-level non-separable secondary transform", Joint Video Exploration Team (JVET) of ITU-T SG 16 WP 3 and 1S0/IEC JTC 1/SC 29/WG 11, 3rd Meeting, 2016, pp. 1-10.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2013, pp. 1-317.

Chen, Jianle, et. al., "Algorithm Description of Joint Exploration Test Model 4 (JEM4)", Joint Video Exploration Team (JVET) of ITU-T SG 16 WP 3 and 1S0/IEC JTC 1/SC 29/WG 11, 4th Meeting, Oct. 2016, pp. 1-39.

Zhao, X., et al., "EE2.7 related: Improved non-separable secondary transform", Joint Video Exploration Team (JVET) of ITU-T SG 16 WP 3 and 1SO/IEC JTC 1/SC 29/WG 11, 3rd Meeting, 2016, pp. 1-3.

Chen J., et al., "Algorithm description of Joint Exploration Test Model 2 (JEM2)", Joint Video Exploration Team (JVET) of ITU-T SG 16 WP 3 and ISO/IEC JTC 1/SC 29/WG 11 N16066, 2nd Meeting, Feb. 2016, pp. 1-33.

Seung-Hwan, Kim, "Cross-check of JVET-0063 EE2.7 related: Improved non-separable secondary transform", Joint Video Exploration Team (JVET) of ITU-T SG 16 WP 3 and 1S0/IEC JTC 1/SC 29/WG 11, 3rd Meeting, 2016, pp. 1-3.

Zhao, X., et al. "EE2. 7 related: Improved non-separable secondary transform." Joint Video Exploration Team (JVET) of ITU-T SG16 WP3 and ISO/IEC JTC1/SC29/WG11 3rd Meeting: Geneva, CH, May 2016.

Kim, S. et al. "Cross check of JVET-0063 EE2. 7 related: Improved non-separable secondary transform." Joint Video Exploration Team (JVET) of ITU-T SG16 WP3 and ISO/IEC JTC1/SC29/WG11 3rd Meeting: Geneva, CH, May 2016.

\* cited by examiner

METHOD AND APPARATUS FOR SELECTING A CODING MODE USED FOR ENCODING/DECODING A RESIDUAL BLOCK

CROSS-REFERENCE TO RELATED APPLICATIONS

The present application is a continuation of U.S. patent application Ser. No. 16/477,430, entitled "METHOD AND APPARATUS FOR SELECTING A CODING MODE USED FOR ENCODING/DECODING A RESIDUAL BLOCK" and filed Jul. 11, 2019, which is incorporated herein by reference in its entirety, and which is a national stage application, under 35 U.S.C. § 371 of International Application PCT/EP2018/050314, entitled "METHOD AND APPARATUS FOR SELECTING A CODING MODE USED FOR ENCODING/DECODING A RESIDUAL BLOCK" and filed Jan. 8, 2018, which was published in accordance with PCT Article 21 (2) on Jul. 19, 2018, in English, and which claims the benefit of European Patent Application No. 17305029.5, filed Jan. 11, 2017.

FIELD

The present principles generally relate to picture/video encoding and decoding. Particularly, but not exclusively, the technical field of the present principles are related to selecting coding mode for encoding/decoding residual data.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, a picture contains one or several arrays of samples (pixel values) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

For coding a picture of a video sequence, video compression methods usually divide the picture into a set of blocks of pixels. Each block is then predicted using information already reconstructed, corresponding to the blocks previously encoded/decoded in the current picture. The coding of a current block is performed using an intra or inter prediction of the current block, and a prediction residual or "residual block" corresponding to a difference between the current block and the predicted block is computed. The resulting residual block is then converted, for example by using a transform such as a DCT (discrete cosine transform) or DST (Discrete Sinus transform) type transform. The coefficients of the transformed residual block are then quantized and encoded by entropy coding and transmitted to a decoder.

In an HEVC video compression standard ("*ITU-T H.265 Telecommunication standardization sector of ITU (10/2014), series H: audiovisual and multimedia systems, infrastructure of audiovisual services—coding of moving video, High efficiency video coding, Recommendation ITU-T H.265*"), a picture is divided into Coding Tree Units (CTU), which size may be 64×64, 128×128 or 256×256 pixels. Each CTU may be further subdivided using a quad-tree division, where each leaf of the quad-tree is called a Coding Unit (CU). Each CU is then given some Intra or Inter prediction parameters. To do so, a CU is spatially partitioned into one or more Prediction Units (PU), a PU may have a square or a rectangular shape. Each PU is assigned some prediction information, such as for example motion information and/or spatial intra prediction.

According to the HEVC video compression standard, each CU may be further subdivided into square Transform Units (TU) for performing the transform of the residual block.

A Quad-Tree plus Binary-Tree (QTBT) coding tool ("*Algorithm Description of Joint Exploration Test Model 3*", Document JVET-C1001_v3, *Joint Video Exploration Team of ISO/IEC JTC1/SC29/WG11, 3rd meeting, 26 May-1 Jun. 2015, Geneva, CH*) provides a more flexible CTU representation than the CU/PU/TU arrangement of the HEVC standard. The Quad-Tree plus Binary-Tree (QTBT) coding tool consists in a coding tree where coding units can be split both in a quad-tree and in a binary-tree fashion.

The splitting of a CU is decided on the encoder side through a rate distortion optimization procedure, which consists in determining the QTBT representation of the CTU with minimal rate distortion cost. In the QTBT representation, a CU has either a square or a rectangular shape. The size of coding unit is always a power of 2, and typically goes from 4 to 128. With the QTBT representation, a CU is not anymore partitioned into PU or TU. With the QTBT representation, the transform of the residual block is performed on blocks of size expressed as a power of 2 and existing separable transform and fast implementation of such transform usually used for square blocks can be re-used.

Thus, a residual block may designate a TU when said residual block is split according to the CU/PU/TU arrangement of HEVC or the CU itself when QTBT is used. Said definition of a residual block is just given for illustrative purpose and does not limit the scope of the present principles which apply to any set of residual data obtained from a picture.

Transforming a residual block is efficient when most of the energy of the residual block is concentrated on few transformed coefficients.

2D separable or non-separable transforms based on well-known DCT (Discrete Cosinus Transform) and/or DST (Discrete sinus Transform) transforms are usually used in video coding because most of the picture energy is concentrated on few frequencies represented by a limited number of significant transformed coefficients.

For example, the Joint Exploration Test Model (JEM) (Joint Collaborative Team of ITU-T SG16 WP3 and ISO/IEC JTC1/SC29/WG11 on Video Coding, JCTVC-V1002, 22nd Meeting, October 2015.), which is build up on top of HEVC test model (C. Rosewarne, B. Bross, M. Naccari, K. Sharman, G. J. Sullivan, "High Efficiency Video Coding (HEVC) Test Model 16 (HM 16) Update 4 of Encoder Description") defines multiple candidate coding modes for transforming data of a residual block.

Some of these candidate coding modes, denoted Enhanced Multiple Transform (EMT), defines a 2D separable transform by combining two 1D DCT and/or DST transforms, one for horizontal and one for vertical.

EMT is used for coding residual data for both inter and intra coded blocks.

For intra residue coding, due to the different residual statistics of different intra prediction modes, four 1D transforms, denoted DST-VII, DCT-VIII, DST-I and DCT-V are used to form three transform sub-sets as shown in Table 1. One of these three transform subsets is first selected based on the intra prediction mode of the residual block to be transformed, as specified in Table 2.

TABLE 1

| Transform set | Transform Candidates |
|---|---|
| 0 | DST-VII, DCT-VIII |
| 1 | DST-VII, DST-I |
| 2 | DST-VII, DCT-V |

TABLE 2

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| H | 2 | 1 | 0 | 1 | 0 | 1 | 0 | 1 | 0 | 0 | 0 | 0 | 0 | 1 | 0 | 1 | 0 | 1 |
| V | 2 | 1 | 0 | 1 | 0 | 1 | 0 | 1 | 2 | 2 | 2 | 2 | 2 | 1 | 0 | 1 | 0 | 1 |
| Intra Mode | 18 | 19 | 20 | 21 | 22 | 23 | 24 | 25 | 26 | 27 | 28 | 29 | 30 | 31 | 32 | 33 | 34 | |
| H | 0 | 1 | 0 | 1 | 0 | 1 | 2 | 2 | 2 | 2 | 2 | 1 | 0 | 1 | 0 | 1 | 0 | |
| V | 0 | 1 | 0 | 1 | 0 | 1 | 0 | 0 | 0 | 0 | 0 | 1 | 0 | 1 | 0 | 1 | 0 | |

For example, when the Intra prediction mode of a residual block to be transformed equals 8, a transform subset index for Horizontal equals 0, i.e either DST-VII or DCT-VIII may be used, and the transform subset index for Vertical equals 2, i.e. either DST-VII or DCT-VIII may be used. Next, for each of the horizontal (H) and vertical (V) identified transform subsets, one of the two transform candidates is determined and the determined transform candidate in the identified transform subset for both Horizontal and Vertical form a coding mode, denoted an EMT mode in the following. An EMT mode is designated by an index denoted EMTidx in the following.

Following the previous example, DST-VII is used for Horizontal transform and DCT-VIII is used for vertical transform.

In the following, nbEMTmodes refers to the maximum number of 2D separable transforms. According to table 1, nbEMTmodes=4 and EMTidx may equal four values, e.g. 0, 1, 2 or 3 to indicate each of said 2D separable transforms.

For inter residual coding, only one 2D separable transform is used in the JEM, which is defined from DST-VII and DCT-VIII. Said 2D separable transform is used for all inter modes and for both horizontal and vertical transforms.

In order to apply the same 2D separable transform to the residual block at the decoder side, EMT requires some signalling. In JEM, when the CU/PU/TU arrangement in HEVC is used, whether EMT applies or not is signalled by a CU level flag (denoted EMTflag in the following) and the EMT mode, selected at the encoding side for the residual block (here a TU), is signalled by the index EMTidx when said residual block (TU) belongs to an EMT enabled CU (EMTflag=1).

When the EMTflag equals 0, i.e. for EMT-disabled CU, the usual HEVC transform, denoted DCT-II, is applied to encode the residual block (each TU of the CU), and when the EMTflag equals 1, i.e. for EMT-enabled CU, the usual HEVC transform DCT-II is replaced by the 2D separable transform identified by EMTidx.

For luma coding block within an EMT-enabled CU, two additional flags are signaled to identify the 1D horizontal and vertical transforms to be used.

Some other of the candidate coding modes defined in the current JEM, usually denoted Non-Separable Secondary Transforms NSST, refer to 2D non-separable transform matrices which each defines a 2D non-separable transform.

NSST may apply only on an intra-coded residual block, e.g a TU within an intra-coded CU when the CU/PU/TU arrangement HEVC is used. But, NSST may also follow EMT, i.e applies on a transformed residual block.

Due to the different residual statistics of different intra prediction modes, several 2D non-separable transform matrices have been defined, and one of these 2D non-separable transform matrices is selected based on the intra prediction mode of the residual block to be transformed. The selected 2D non-separable transform matrix defines a coding mode, denoted NSST mode in the following, and a NSST mode is identified by an index denoted NSSTidx.

In JEM, several transform subsets are defined, each comprising three 2D non-separable transform matrices. Thus, a transform subset is first selected based on the intra prediction mode of the residual block to be transformed as specified in Table 3.

TABLE 3

| luma intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| transform set index | 0 | 0 | 1 | 2 | 1 | 2 | 1 | 2 | 3 | 4 | 3 | 4 | 3 | 4 | 5 | 5 | 5 |
| luma intra mode | 17 | 18 | 19 | 20 | 21 | 22 | 23 | 24 | 25 | 26 | 27 | 28 | 29 | 30 | 31 | 32 | 33 |
| transform set index | 6 | 6 | 6 | 7 | 7 | 7 | 8 | 9 | 8 | 9 | 8 | 9 | 10 | 11 | 10 | 11 | 10 |
| luma intra mode | 34 | 35 | 36 | 37 | 38 | 39 | 40 | 41 | 42 | 43 | 44 | 45 | 46 | 47 | 48 | 49 | 50 |

TABLE 3-continued

| transform set index | 11 | 10 | 11 | 10 | 11 | 10 | 9 | 8 | 9 | 8 | 9 | 8 | 7 | 7 | 7 | 6 | 6 |
|---|---|---|---|---|---|---|---|---|---|---|---|---|---|---|---|---|---|
| luma intra mode | 51 | 52 | 53 | 54 | 55 | 56 | 57 | 58 | 59 | 60 | 61 | 62 | 63 | 64 | 65 | 66 | 67 (LM) |
| transform set index | 6 | 5 | 5 | 5 | 4 | 3 | 4 | 3 | 4 | 3 | 2 | 1 | 2 | 1 | 2 | 1 | 0 |

Next, one of the three 2D non-separable transform matrices is determined from said selected transform subset and the determined 2D non-separable transform matrix forms a NSST mode that is identified by the index NSSTidx.

In order to apply the same 2D non-separable transform to the residual block at the decoder side, NSST requires some signaling. In JEM, when the CU/PU/TU arrangement in HEVC is used, whether NSST applies or not is signalled at the CU level by the index NSSTidx for each residual block (for each TU of a CU) when there is more than one non-zero coefficient in said residual block (CU). The default value is zero when NSSTidx is not signaled (NSST disable).

EMT and NSST define their own candidate coding modes (EMT mode and NSST mode) which may interact with a transform skip mode that is set to deactivate transform and directly code the residual block in the spatial domain. The transform skip mode is signaled by a flag Tskip in HEVC.

As described above, HEVC provides multiple opportunities for transforming a residual block including EMT, NSST or a combination of them.

But, for a given residual block to be transformed, a selecting process is required for determining which of those EMT or NSST candidate coding modes shall be used (or a combination of them) for transforming said given residual block.

FIG. 1 illustrates a method for selecting a coding mode for encoding a residual block when EMT, NSST and the transform skip mode interact to each other in accordance with the JEM.

Basically, the method successively evaluates a rate-distortion cost (RDO cost) of the coding of the residual block (here a TU within a CU to be encoded) for each candidate coding mode and selects the one with the lowest rate-distortion cost.

As previously explained, an EMT mode is defined by EMTflag that enable or not, at the CU level, the use of an EMT mode for transforming a residual block (a TU within the CU) and by EMTidx that defines a specific EMT mode for the residual block (a TU belonging to a EMT-enabled CU). Moreover, a NSST mode is defined at the CU level by NSSTidx that defines whether NSST is enabled (NSSTidx≠0) or disabled (NSSTidx=0) and if enabled, a specific NSST mode for the residual block (a TU within a CU).

All the parameters of the method, i.e. EMTflag, EMTidx, nbEMTmodes (maximum number of EMT modes), NSSTidx, nbNSSTmodes (maximum number of NSST modes) are initialized. Here, NSSTidx=EMTflag=EMTidx=Tskip=0, nbNSSTmodes=nbEMTmodes=4.

In step 110, a module computes a rate-distortion cost for encoding the residual block (a TU within the CU) according to coding mode determined from the current values of EMTidx, EMTflag and NSSTidx. Note that said coding mode may be an EMT mode, an NSST mode or an EMT mode followed by a NSST mode as explained above. If the rate-distortion cost is the lowest (or the first), then cost and parameters are stored as "selected parameters"

Next, steps 120-190 determine an update of the current values of the parameters in order to enable or disable specific combinations of the EMT modes, NSST modes and the transform skip mode.

More precisely, in step 120, a module checks if the EMTidx value is strictly lower than a value T computed from EMTflag, Tskip and nbEMTmodes values.

According to an embodiment, the value T equals nbEMTmodes −1 when both the EMTflag=1 and Tskip=0, i.e. when EMT is enabled and the skip mode for the TU is disabled. Otherwise, T=0.

The value T is computed by:

((EMTflag&&!Tskip)?nbEMTmodes−1:0)

If the EMTidx value is strictly lower than the value T, then in step 130, the EMTidx value is incremented by 1 in order to consider another EMT mode. The step 110 follows the step 130.

Otherwise, in step 140, a module checks whether the Tskip value is strictly lower than 1.

If the Tskip value is strictly lower than 1 then the Tskip value is incremented by 1 (step 150) in order to consider the Tskip mode for encoding the residual block. The step 110 follows the step 150.

Otherwise, in step 160, a module checks whether the EMTflag value is strictly lower than 1.

If the EMTflag value is strictly lower than 1 then the EMTflag value is incremented by 1 (step 170). The step 110 follows the step 170.

Otherwise, in step 180, a module checks whether the NSSTidx value is strictly lower than (nbNSSTmodes −1).

If the NSSTidx value is strictly lower than (nbNSSTmodes −1), the NSSTidx is incremented by 1 (step 190). The step 110 follows the step 190.

Otherwise, the method ends and the current values of the parameters are used for encoding the residual block.

Once the coding modes for coding a residual block (a TU of a CU) are selected, the values of the parameters EMTflag, Tskip, EMTidx and NSSTidx shall be coded in (respectively decoded from) a bitstream in order to define the same coding mode of the residual block at the decoding side.

FIG. 2 shows a block diagram of the steps of a method for coding (respectively decoding) the parameters required for coding (respectively decoding) a residual block.

In step 200, a module checks whether the use of EMT is enabled (use-EMT=1). Note, use-EMT is a parameter of the coder/decoder stored in the SPS (Sequence Parameter Set) or PPS (Picture Parameter Set) in HEVC.

If EMT is enabled, in step 210, a module codes an EMTflag (for a current CU) into a bitstream (respectively decoded the EMTflag from the bitstream).

Otherwise, in step 220, a module set the EMTflag equals to 0.

In step 230, a module checks if EMTflag=0.

If EMTflag=0 or following step 200, in step 240, a module codes (respectively decodes) the Tskip value, output of the FIG. 1, into a bitstream (respectively decoded the EMTflag from the bitstream F).

If EMTflag=1 (step 230), in step 250, a module checks whether the Tskip value equals 0 and the EMTflag equals 1 (i.e. an EMT mode is used for encoding the residual block).

If the Tskip value equals 0 and the EMTflag equals 1, then, in step 260, a module codes (respectively decodes) the EMTidx value, output of the FIG. 1, into a bitstream (respectively from a bitstream).

Otherwise, step 270 follows step 250.

In step 270, a module checks if the Tskip value equals 0 and if the use of NSST is enabled (use-NSST=1). Note, use-NSST is a parameter of the coder/decoder stored in the SPS (Sequence Parameter Set) or PPS (Picture Parameter Set).

If the Tskip value equals 0 and use-NSST=1 (i.e. an NSST mode is used for encoding the residual block), then, in step 280, a module codes (respectively decodes) the NSSTidx value, output of the FIG. 1, into a bitstream (respectively from a bitstream).

Otherwise, the process ends.

According to this selection of a coding mode, the value of Tskip is systematically checked (step 250, 270) in order to disable the use of an EMT or NSST coding mode when the skip mode is selected for encoding a residual block. Thus, Tskip flag shall be signaled for each residual block to be encoded (each TU of a CU). Moreover, the EMT and NSST modes are selected independently to each other, allowing an exhaustive search of the optimal encoding mode from all possible candidate coding modes but with a high complexity at the encoding side.

SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method for encoding a residual block comprising:
- obtaining a first coding mode relative to a first 2D transform when coding the residual blocks according to a coding mode relative to a first 2D transform is enabled;
- obtaining a second coding mode relative to a second 2D transform when coding the residual blocks according to a coding mode relative to a second 2D transform is enabled; and
- encoding the residual block according to either said first coding mode or said second coding mode or both. The method is characterized in that enabling or disabling the coding of the residual block according to said second coding mode depends on said first coding mode.

The method allows to restrict overall coding modes, that results in reduced complexity at the encoding side with reduced and acceptable performance loss.

According to an embodiment, the first 2D transform is a 2D separable transform and the second 2D transform is a 2D non-separable transform.

According to an embodiment, the coding of the residual block according to said second coding mode is enabled when the skip mode is disabled and when said first coding mode belongs to a predefined set of candidate coding modes.

According to an embodiment, the coding of the residual block according said second coding mode is enabled when the skip mode is disabled and when coding the residual blocks according to said first a coding mode is disabled.

According to an embodiment, said second coding mode is obtained (510) from a set of candidate coding modes and/or the cardinality and at least one of the candidate coding modes of said set of candidate coding modes are defined according to said first coding mode and/or whether coding the residual blocks according to said second coding mode enabled or disabled. According to other of their aspects, the present principles relate to a method/device for encoding/decoding a picture comprising a step for encoding a residual block according to the previous method and a non-transitory storage medium carrying instructions of program code for executing steps of at least one of the above methods when said program is executed on a computing device.

The specific nature of the present principles as well as other objects, advantages, features and uses of the present principles will become evident from the following description of examples taken in conjunction with the accompanying drawings.

BRIEF DESCRIPTION OF DRAWINGS

In the drawings, examples of the present principles are illustrated. It shows.

Similar or same elements are referenced with the same reference numbers.

DESCRIPTION OF EXAMPLE OF THE PRESENT PRINCIPLES

Figure 1:
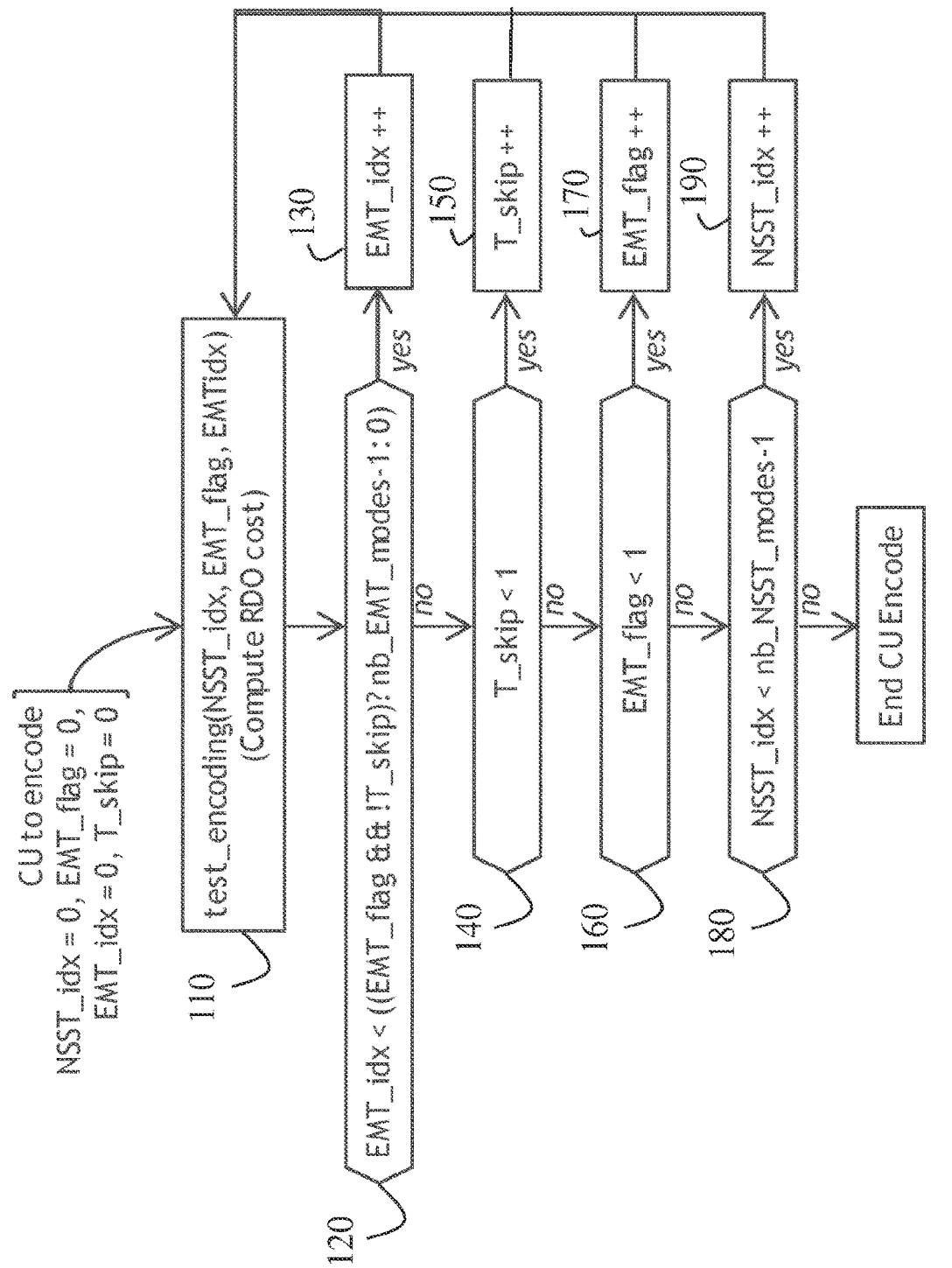
FIG. 1 illustrates a method for selecting a coding mode for encoding a residual block when EMT, NSST and the transform skip mode interact to each other in accordance with the JEM.
Figure 2:
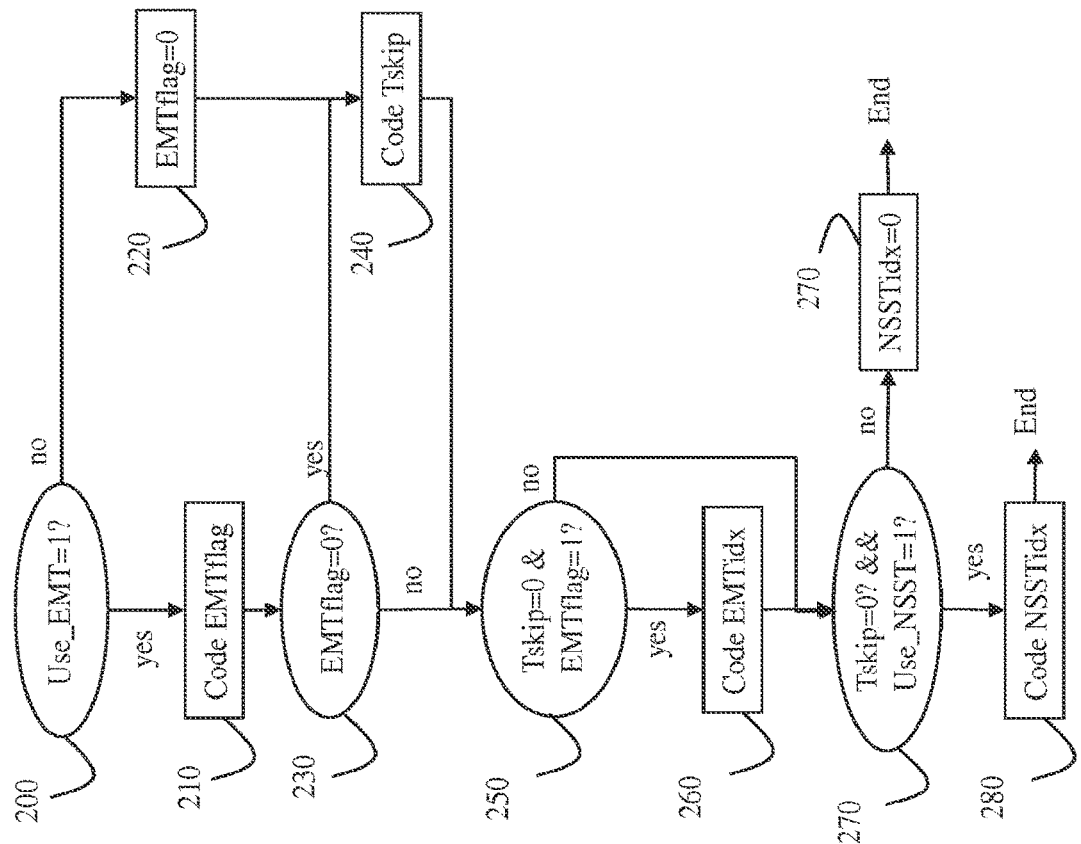
FIG. 2 shows a block diagram of the steps of a method for coding (respectively decoding) the parameters required for coding (respectively decoding) a residual block.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding a set of pictures of a video but extends to the encoding/decoding a still picture because each picture of the video is sequentially encoded/decoded as described below.

Figure 3:
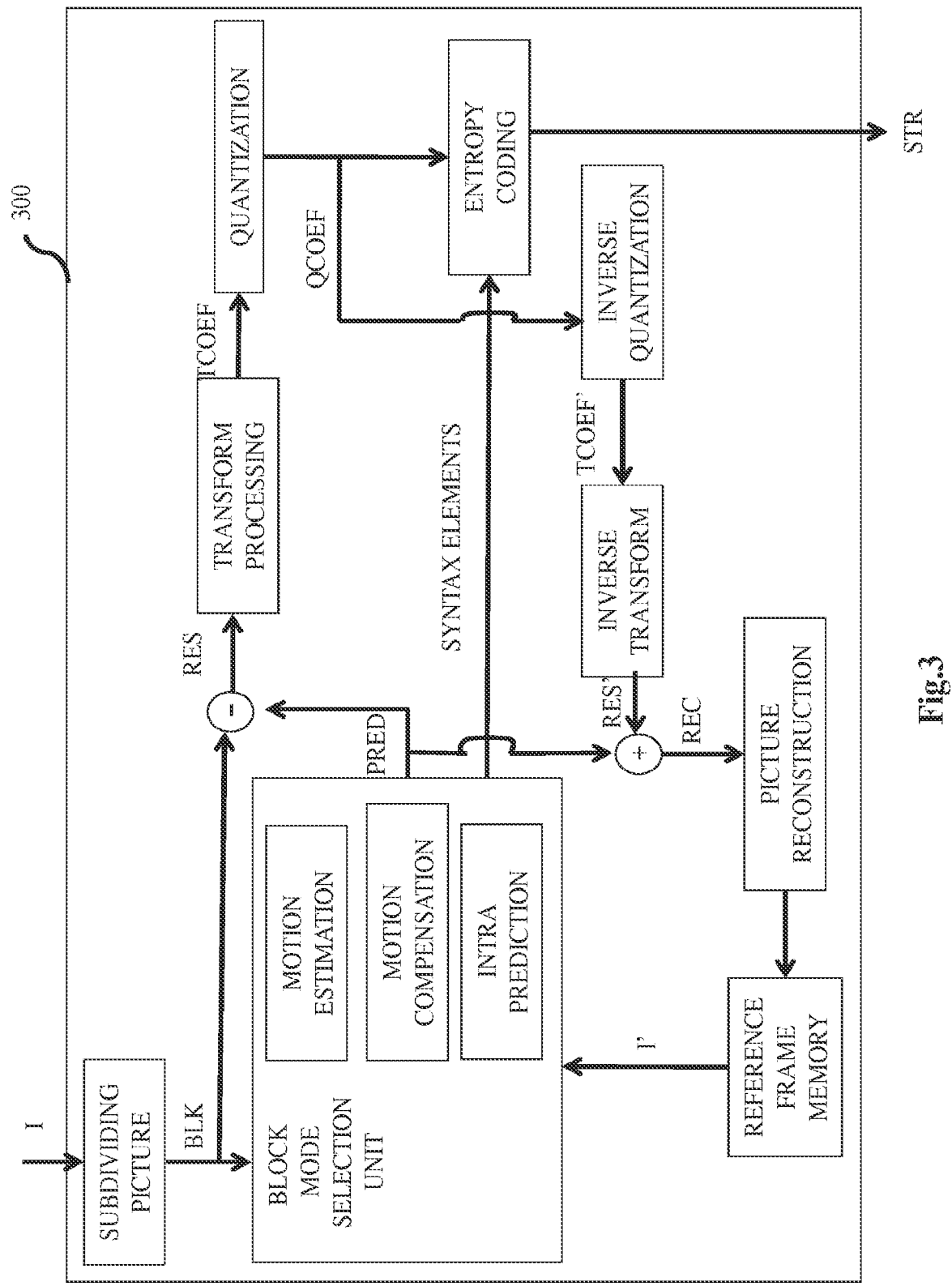
FIG. 3 is a schematic block diagram illustrating an exemplary video encoder in which the present principle could be implemented.

FIG. 3 is a schematic block diagram illustrating an exemplary video encoder 300 in which the present principle could be implemented.

Classically, the video encoder 300 may include several modules for block-based video encoding, as illustrated in FIG. 3. A picture I to be encoded is input to the encoder 300. The encoder 300 comprises a subdividing picture unit for splitting the picture I into blocks BLK, and a mode selection unit for selecting a coding mode for a block BLK, e.g. based on a rate/distortion optimization, such a mode selection unit comprising:

a motion estimation module for estimating motion between one current block of the picture to be coded and reference pictures, a motion compensation module for predicting the current block BLK using the estimated motion, an intra prediction module for spatially predicting the current block BLK.

The mode selection unit delivers prediction blocks PRED and the corresponding syntax elements to be coded in the bitstream for performing the same block prediction at the decoder.

Residual blocks RES are then obtained from the blocks BLK and the prediction blocks PRED. The residual blocks RES are transformed by a transform processing module, configured to implement the present principles, and the transformed coefficients TCOEFF are quantized by a quantization module delivering quantized residual transform coefficients QCOEF.

The syntax elements and quantized residual transform coefficients QCOEF are then inputted to an entropy coding module to deliver coded video data. Said coded video data are, for example, stored into a memory or added to a bitstream STR for transmission to a decoder for example.

The quantized residual transform coefficients COEF are processed by an inverse quantization module and inverse transform module, configured to implement the present principles, for reconstructing residual blocks RES'.

Prediction blocks PRED are added to the reconstructed residual blocks RES' for reconstructing blocks forming a reconstructed current picture REC. The reconstructed current picture REC is then added to a reference frame memory for later use as a reference picture for encoding the following pictures of the video content.

Figure 4:
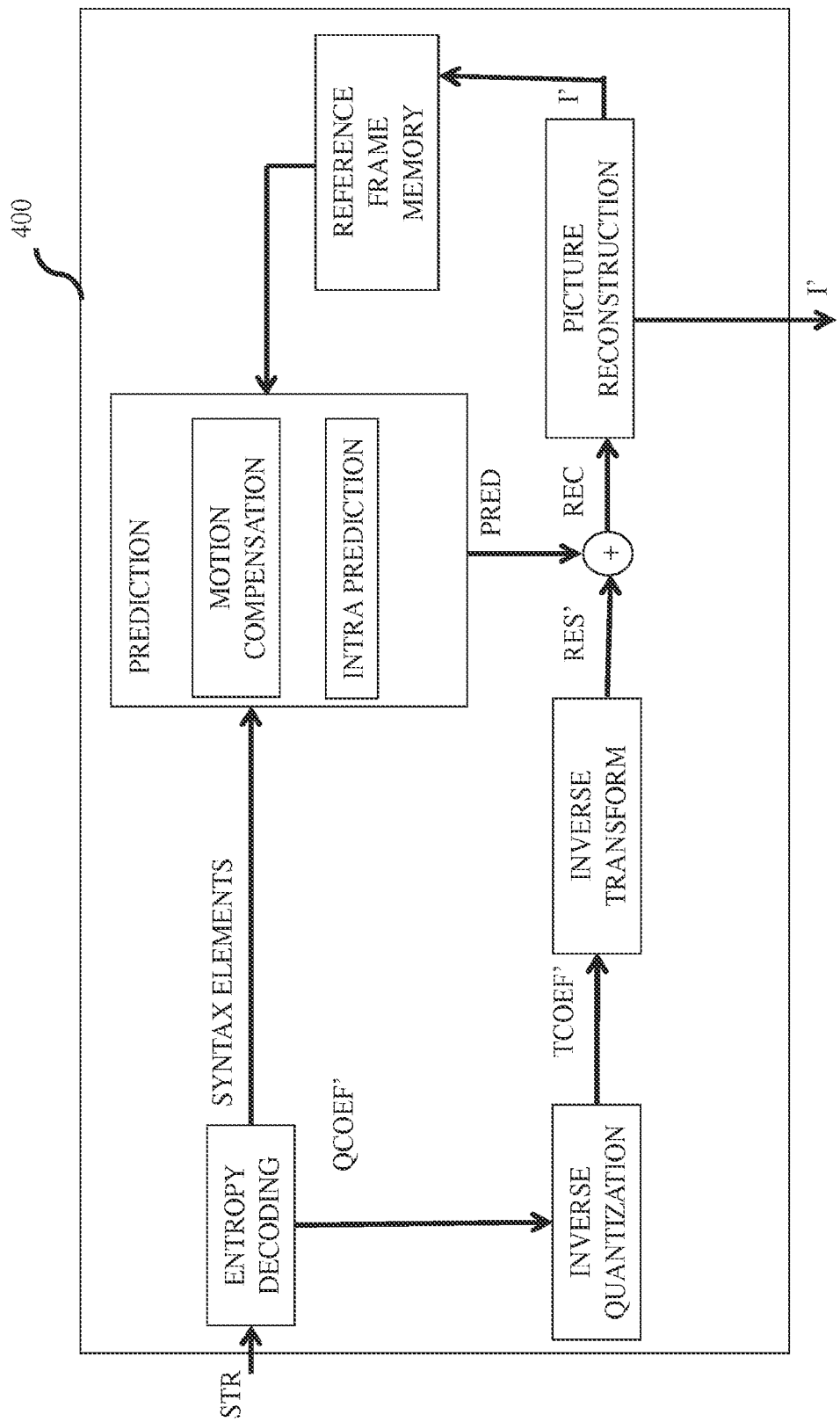
FIG. 4 is a schematic block diagram illustrating an exemplary video decoder in which the present principle could be implemented.

FIG. 4 is a schematic block diagram illustrating an exemplary video decoder 400 in which the present principle could be implemented. The video decoder may comprise a receiver of a bitstream STR representative of a coded image or video including coded data representative of at least one block of said image or video, wherein said block has been coded according to an embodiment of the present disclosure. The video decoder parses the bitstream SRT to get the coded data which is passed to an entropy decoding module that performs entropy decoding and delivers quantized coefficients QCOEF' to an inverse quantization module and syntax elements to a prediction module. The quantized coefficients QCOEF' are inverse quantized by the inverse quantization module and the inverse quantized coefficients TCOEFF' are inverse transformed by an inverse transform module delivering residual blocks data RES'. Said inverse transform module is configured to implement the present principles. The prediction module builds prediction blocks PRED according to the syntax element and using a motion compensation module if a current block has been inter-predicted or an intra prediction module if the current block has been spatially predicted. A reconstructed picture I' is formed from reconstructed blocks obtained by adding prediction blocks PRED and residual blocks RES'. The reconstructed picture I' is added to a reference frame memory for later use as reference frame. The reconstructed picture I' is then outputted by the video decoder 400.

The video decoder 400 is configured to decode data which have been encoded by the video encoder 300.

The video encoder 300 (and the video decoder 400) is not limited to a specific encoder which may be, for example, an image/video coder with loss like JPEG, JPEG2000, MPEG2, HEVC recommendation or H264/AVC recommendation ("Advanced video coding for generic audiovisual Services", SERIES H: AUDIOVISUAL AND MULTIMEDIA SYSTEMS, Recommendation ITU-T H.264, Telecommunication Standardization Sector of ITU, February 2014)).

Figure 5:
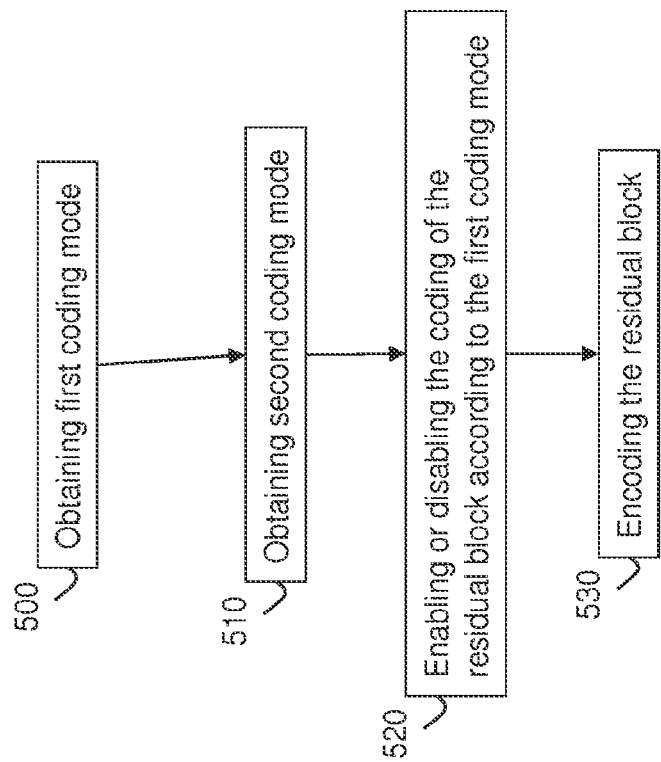
FIG. 5 shows a block diagram of the steps of a method for encoding a residual block in accordance with an example of the present principles.

FIG. 5 shows a block diagram of the steps of a method for encoding a residual block in accordance with an example of the present principles.

In step 500, a module obtains a first coding mode relative to a first 2D transform when coding the residual blocks according to a coding mode relative to a first 2D transform is enabled.

In step 510, a module obtains a second coding mode relative to a second 2D transform (distinct of the first 2D transform) when coding the residual blocks according to a coding mode relative to a second 2D transform is enabled.

In step 520, a module enables or disables the coding of the residual block according to said second coding mode according to said first coding mode.

In step 530, a module encodes the residual block according to either said first coding mode or said second coding mode if enabled or both.

Preferably, a first 2D transform and a second 2D transform may be separable or non-separable 2D transforms.

In accordance with a non-limitative embodiment of the present principles, a first coding mode is the index EMTidx, as defined in the introducing part, and a second coding mode is the index NSSTidx, as defined in the introducing part. Thus, said first coding mode indicates a 2D separable transform built by combining a 1D horizontal transform with a 1D vertical transform and the second coding mode indicates a 2D non-separable transform as explained in the introducing part (Tables 1, 2 and 3).

Enabling or disabling NSST depends thus on the value of EMTidx according to this example.

According to another non-limitative embodiment of the present principles, a first coding mode is the index NSSTidx and a second coding mode is the index EMTidx, as defined in the introducing part. Thus, said first coding mode indicates a 2D non-separable transform and the second coding mode indicates a 2D separable transform as explained in the introducing part (Tables 1, 2 and 3) and enabling or disabling EMT depends thus on the value of NSSTidx according to this example.

Generally speaking, in accordance with the present principles, a first coding mode may indicate a separable or non-separable 2D transform and a second coding mode may indicate a separable or non-separable 2D transform and a second coding mode; Enabling or disabling the coding of the residual block according to said second coding mode depends on said first coding mode. Said last feature applies independently of whether said first and/or second coding mode indicate a 2D separable or non-separable transform.

According to a variant the present principles, the coding of the residual block according to said second coding mode is enabled when the skip mode is disabled (Tskip=0) and when said first coding mode belongs to a predefined set of candidate coding modes.

The coding of the residual block according to a second coding mode is then disabled when Tskip=1 and/or when said first coding mode does not belong to said predetermined set of candidate coding modes.

Table 4 gives a nonlimitative example of this variant of the present principles wherein the coding of the residual block according to a second coding mode (NSSTidx) is enabled when Tskip=0 and when the first coding mode EMTidx<1 (the predetermined set of candidate coding modes equals to the single value 0).

TABLE 4

|  | No EMT | EMTidx = 0 | EMTidx = 1 | EMTidx = 2 | EMTidx = 3 |
| --- | --- | --- | --- | --- | --- |
| NSSTidx = 0 | Allowed | Allowed | Allowed | Allowed | Allowed |
| NSSTidx = 1 | Allowed | Allowed |  |  |  |
| NSSTidx = 2 | Allowed | Allowed |  |  |  |
| NSSTidx = 3 | Allowed | Allowed |  |  |  |

Thus, following Table 4, when the first coding index EMTidx=0, NSST is enabled and the coding of the residual block may depend on the first coding mode EMTidx and/or one of the NSSTidx according to the result of the rate-distortion optimization (refers to the introducing part for more details).

Table 5 gives another nonlimitative example of the variant of said present principles wherein the coding of the residual block according to a second coding mode (NSSTidx) is enabled when Tskip=0 and when the first coding mode EMTidx=0 or 2 (the predetermined set of candidate coding modes comprises here the values 0 and 2).

Note that all the possible NSST coding mode may or not be enabled when the first coding mode belongs to the predetermined set of candidate coding modes as illustrated in Table 5. Here, only the coding mode with the index NSSTidx 1 is enabled when EMTidx=0 and the coding mode with the indices NSSTidx=1 or 2 are enabled when EMTidx=2. Note that NSSTidx=0 means NSST is disabled.

TABLE 5

|  | No EMT | EMTidx = 0 | EMTidx = 1 | EMTidx = 2 | EMTidx = 3 |
| --- | --- | --- | --- | --- | --- |
| NSSTidx = 0 | Allowed | Allowed | Allowed | Allowed | Allowed |
| NSSTidx = 1 | Allowed | Allowed |  | Allowed |  |
| NSSTidx = 2 | Allowed |  |  | Allowed |  |
| NSSTidx = 3 | Allowed |  |  |  |  |

According to a variant of the present principles, the coding of the residual block according to a second coding mode is enabled when the skip mode is disabled and when coding the residual blocks according to a first coding mode is disabled, i.e. when Tskip=0 and EMTflag=0. Note, EMTflag=0 means that a CU is EMT-disabled, i.e the usual HEVC transform is used for encoding the residual block (each TU of the CU), not a first 2D transform defined by an EMT mode.

The coding of the residual block according to a second coding mode (NSSTidx) is then not allowed when Tskip=1 and/or EMTflag=1.

According to a variant of the embodiment of step 510, the second coding mode is obtained from a set of candidate coding modes and the cardinality of said set of candidate coding modes and/or at least one of the candidate coding mode of said set of candidate coding modes are defined according to said first coding mode and/or whether coding the residual blocks according to said second coding mode is enabled or disabled.

For example, when the first coding mode is indicated by EMTidx and the second coding mode is indicated by NSSTidx, the cardinality of the set of candidate coding modes and/or at least one of the candidate coding modes are defined according to EMTidx and/or the value of NSSTidx: NSSTidx=0 means NSST disabled) and NSSTidx≠0 means NSST enabled.

On FIG. 1-5, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 6:
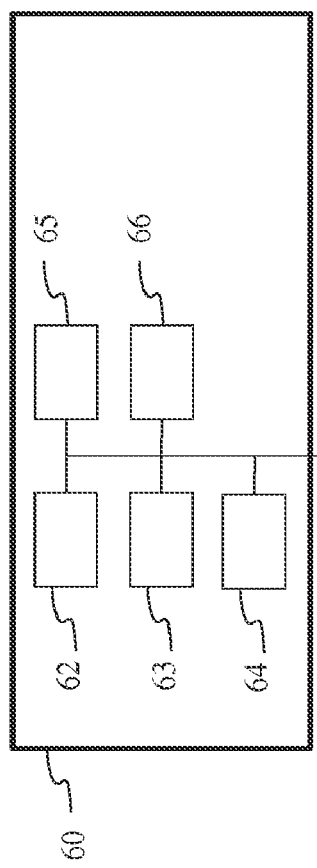
FIG. 6 shows an example of an architecture of a device in accordance with an example of present principles.

FIG. 6 represents an exemplary architecture of a device 60 which may be configured to implement a method described in relation with FIG. 1-5.

Device 60 comprises following elements that are linked together by a data and address bus 61:
a microprocessor 62 (or CPU), which is, for example, a DSP (or Digital Signal Processor);
a ROM (or Read Only Memory) 63;
a RAM (or Random Access Memory) 64;
an I/O interface 65 for reception of data to transmit, from an application; and
a battery 66

In accordance with an example, the battery 66 is external to the device. In each of mentioned memory, the word «register» used in the specification can correspond to area of small capacity (some bits) or to very large area (e.g. a whole program or large amount of received or decoded data). The ROM 63 comprises at least a program and parameters. The ROM 63 may store algorithms and instructions to perform techniques in accordance with present principles. When switched on, the CPU 62 uploads the program in the RAM and executes the corresponding instructions.

RAM 64 comprises, in a register, the program executed by the CPU 62 and uploaded after switching on of the device 60, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the picture I is obtained from a source. For example, the source belongs to a set comprising:
a local memory (63 or 64), e.g. a video memory or a RAM (or Random Access Memory), a flash memory, a ROM (or Read Only Memory), a hard disk;
a storage interface (65), e.g. an interface with a mass storage, a RAM, a flash memory, a ROM, an optical disc or a magnetic support;
a communication interface (65), e.g. a wireline interface (for example a bus interface, a wide area network interface, a local area network interface) or a wireless interface (such as a IEEE 802.11 interface or a Bluetooth® interface); and
an picture capturing circuit (e.g. a sensor such as, for example, a CCD (or Charge-Coupled Device) or CMOS (or Complementary Metal-Oxide-Semiconductor)).

In accordance with an example of the decoding or a decoder, the decoded picture I' is sent to a destination; specifically, the destination belongs to a set comprising:
a local memory (63 or 64), e.g. a video memory or a RAM, a flash memory, a hard disk;
a storage interface (65), e.g. an interface with a mass storage, a RAM, a flash memory, a ROM, an optical disc or a magnetic support;
a communication interface (65), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
a display.

In accordance with examples of encoding or encoder, the bitstream STR is sent to a destination. As an example, the bitstream STR is stored in a local or remote memory, e.g. a video memory (64) or a RAM (64), a hard disk (63). In a variant, the bitstream STR is sent to a storage interface (65), e.g. an interface with a mass storage, a flash memory, ROM, an optical disc or a magnetic support and/or transmitted over a communication interface (65), e.g. an interface to a point to point link, a communication bus, a point to multipoint link or a broadcast network.

In accordance with examples of decoding or decoder, the bitstream STR is obtained from a source. Exemplarily, the bitstream STR is read from a local memory, e.g. a video memory (64), a RAM (64), a ROM (63), a flash memory (63) or a hard disk (63). In a variant, the bitstream STR is received from a storage interface (65), e.g. an interface with a mass storage, a RAM, a ROM, a flash memory, an optical disc or a magnetic support and/or received from a communication interface (65), e.g. an interface to a point to point link, a bus, a point to multipoint link or a broadcast network.

In accordance with examples, device 60 being configured to implement an encoding method described in relation with FIGS. 3 and 5, belongs to a set comprising:
a mobile device;
a communication device;
a game device;
a tablet (or tablet computer);
a laptop;
a still picture camera;
a video camera;
an encoding chip;

a still picture server; and
a video server (e.g. a broadcast server, a video-on-demand server or a web server).

In accordance with examples, device 60 being configured to implement a decoding method described in relation with FIGS. 4 and 5, belongs to a set comprising:
a mobile device;
a communication device;
a game device;
a set top box;
a TV set;
a tablet (or tablet computer);
a laptop;
a display and
a decoding chip.

Figure 7:
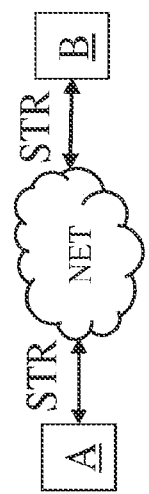
FIG. 7 shows two remote devices communicating over a communication network in accordance with an example of present principles.

According to an example of the present principles, illustrated in FIG. 7, in a transmission context between two remote devices A and B over a communication network NET, the device A comprises a processor in relation with memory RAM and ROM which are configured to implement a method for encoding a residual block as described in relation with the FIG. 5 or a method for encoding a picture as described in relation with the FIG. 3 and the device B comprises a processor in relation with memory RAM and ROM which are configured to implement a method for encoding a residual block as described in relation with the FIG. 5 or a method for decoding as described in relation with FIG. 4.

In accordance with an example, the network is a broadcast network, adapted to broadcast still pictures or video pictures from device A to decoding devices including the device B including the bitstream STR.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
decoding a residual block according to a first coding mode or a second coding mode or both the first coding mode and the second coding mode;
wherein enabling or disabling decoding of the residual block according to the second coding mode is responsive to a determination that the first coding mode is disabled;
wherein the first coding mode indicates a first 2D transform for coding the residual block when the first coding mode is enabled, wherein the first 2D transform is from a first set of 2D transforms;
wherein the second coding mode indicates a second 2D transform for coding the residual block when the second coding mode is enabled, wherein the second 2D transform is from a second set of 2D transforms;
wherein one of the first set of 2D transforms and the second set of 2D transforms is a set of separable 2D transforms and the other of the first set of 2D transforms and the second set of 2D transforms is a set of non-separable 2D transforms; and wherein the second coding mode is obtained from a first set of coding modes and cardinality of the first set of coding modes is defined according to the first coding mode.

2. The method of claim 1, wherein the decoding of the residual block according to the second coding mode is enabled responsive to a determination that a skip mode is disabled.

3. The method of claim 1, wherein at least one of the coding modes of the first set of coding modes is identified according to the first coding mode.

4. The method of claim 1, wherein the decoding of the residual block according to the second coding mode is enabled responsive to a determination that a skip mode is disabled and that the first coding mode belongs to a second set of coding modes.

5. A device comprising at least one processor configured to:
decode a residual block according to a first coding mode or a second coding mode or both the first coding mode and the second coding mode;
wherein enabling or disabling decoding of the residual block according to the second coding mode is responsive to a determination that the first coding mode is disabled;
wherein the first coding mode indicates a first 2D transform for coding the residual block when the first coding mode is enabled, wherein the first 2D transform is from a first set of 2D transforms;
wherein the second coding mode indicates a second 2D transform for coding the residual block when the second coding mode is enabled, wherein the second 2D transform is from a second set of 2D transforms;
wherein one of the first set of 2D transforms and the second set of 2D transforms is a set of separable 2D transforms and the other of the first set of 2D transforms and the second set of 2D transforms is a set of non-separable 2D transforms; and
wherein the second coding mode is obtained from a first set of coding modes and cardinality of the first set of coding modes is defined according to the first coding mode.

6. The device of claim 5, wherein the decoding of the residual block according to the second coding mode is enabled responsive to a determination that a skip mode is disabled.

7. The device of claim 5, wherein at least one of the coding modes of the first set of coding modes is identified according to the first coding mode.

8. The device of claim 5, wherein the decoding of the residual block according to the second coding mode is enabled responsive to a determination that a skip mode is disabled and that the first coding mode belongs to a second set of coding modes.

9. A method comprising:
encoding a residual block according to a first coding mode or a second coding mode or both the first coding mode and the second coding mode;
wherein enabling or disabling encoding of the residual block according to the second coding mode is responsive to a determination that the first coding mode is disabled;
wherein the first coding mode indicates a first 2D transform for coding the residual block when the first coding mode is enabled, wherein the first 2D transform is from a first set of 2D transforms;
wherein the second coding mode indicates a second 2D transform for coding the residual block when the second coding mode is enabled, wherein the second 2D transform is from a second set of 2D transforms;
wherein one of the first set of 2D transforms and the second set of 2D transforms is a set of separable 2D transforms and the other of the first set of 2D transforms and the second set of 2D transforms is a set of non-separable 2D transforms; and
wherein the second coding mode is obtained from a first set of coding modes and cardinality of the first set of coding modes is defined according to the first coding mode.

10. The method of claim 9, wherein the encoding of the residual block according to the second coding mode is enabled responsive to a determination that a skip mode is disabled.

11. The method of claim 9, wherein at least one of the coding modes of the first set of coding modes is identified according to the first coding mode.

12. The method of claim 9, wherein the encoding of the residual block according to the second coding mode is enabled responsive to a determination that a skip mode is disabled and that the first coding mode belongs to a second set of coding modes.

13. A device comprising at least one processor configured to:
encode a residual block according to a first coding mode or a second coding mode or both the first coding mode and the second coding mode;
wherein enabling or disabling encoding of the residual block according to the second coding mode is responsive to a determination that the first coding mode is disabled;
wherein the first coding mode indicates a first 2D transform for coding the residual block when the first coding mode is enabled, wherein the first 2D transform is from a first set of 2D transforms;
wherein the second coding mode indicates a second 2D transform for coding the residual block when the second coding mode is enabled, wherein the second 2D transform is from a second set of 2D transforms;
wherein one of the first set of 2D transforms and the second set of 2D transforms is a set of separable 2D transforms and the other of the first set of 2D transforms and the second set of 2D transforms is a set of non-separable 2D transforms; and
wherein the second coding mode is obtained from a first set of coding modes and cardinality of the first set of coding modes is defined according to the first coding mode.

14. The device of claim 13, wherein the encoding of the residual block according to the second coding mode is enabled responsive to a determination that a skip mode is disabled.

15. The device of claim 13, wherein at least one of the coding modes of the first set of coding modes is identified according to the first coding mode.

16. The device of claim 13, wherein the encoding of the residual block according to the second coding mode is enabled responsive to a determination that a skip mode is disabled and that the first coding mode belongs to a second set of coding modes.

17. A non-transitory storage computer-readable storage medium comprising instructions that cause a processor to:

decode a residual block according to a first coding mode or a second coding mode or both the first coding mode and the second coding mode;

wherein enabling or disabling decoding of the residual block according to the second coding mode is responsive to a determination that the first coding mode is disabled;

wherein the first coding mode indicates a first 2D transform for coding the residual block when the first coding mode is enabled, wherein the first 2D transform is from a first set of 2D transforms;

wherein the second coding mode indicates a second 2D transform for coding the residual block when the second coding mode is enabled, wherein the second 2D transform is from a second set of 2D transforms;

wherein one of the first set of 2D transforms and the second set of 2D transforms is a set of separable 2D transforms and the other of the first set of 2D transforms and the second set of 2D transforms is a set of non-separable 2D transforms; and wherein the second coding mode is obtained from a first set of coding modes and cardinality of the first set of coding modes is defined according to the first coding mode.

18. The non-transitory storage computer-readable storage medium of claim 17, wherein the decoding of the residual block according to the second coding mode is enabled responsive to a determination that a skip mode is disabled.

19. The non-transitory storage computer-readable storage medium of claim 17, wherein at least one of the coding modes of the first set of coding modes is identified according to the first coding mode.

20. The non-transitory storage computer-readable storage medium of claim 17, wherein the decoding of the residual block according to the second coding mode is enabled responsive to a determination that a skip mode is disabled and that the first coding mode belongs to a second set of coding modes.

* * * * *